United States Patent [19]

Kobayashi

[11] Patent Number: 4,562,734
[45] Date of Patent: Jan. 7, 1986

[54] SYSTEM FOR MEASURING QUANTITY OF LIQUID CONTAINED IN TANK

[75] Inventor: Hiroshi Kobayashi, Yokohama, Japan

[73] Assignee: Nissan Motor Co., Ltd., Yokohama, Japan

[21] Appl. No.: 511,384

[22] Filed: Jul. 6, 1983

[30] Foreign Application Priority Data

Jul. 12, 1982 [JP] Japan .............................. 57-104424[U]

[51] Int. Cl.⁴ ............................................ G01F 23/10
[52] U.S. Cl. ........................................ 73/311; 73/313; 338/33
[58] Field of Search .......................... 73/313, 311, 308; 33/378

[56] References Cited

U.S. PATENT DOCUMENTS

| | | | |
|---|---|---|---|
| 2,104,898 | 1/1938 | DeGiers | 338/164 X |
| 2,516,452 | 7/1950 | DeGiers et al. | 73/311 |
| 3,842,512 | 10/1974 | Stoltz et al. | 33/378 X |
| 4,096,638 | 6/1978 | Schimming | 33/378 X |
| 4,178,802 | 12/1979 | Yamamoto | 73/313 |
| 4,184,370 | 1/1980 | Schlick et al. | 73/313 |
| 4,194,396 | 3/1980 | Oshawa et al. | 73/313 X |
| 4,487,066 | 12/1984 | Pardi et al. | 73/304 C |

FOREIGN PATENT DOCUMENTS

| | | | |
|---|---|---|---|
| 2649580 | 9/1978 | Fed. Rep. of Germany | 73/311 |
| 51-80158 | 6/1976 | Japan | 73/313 |

Primary Examiner—Daniel M. Yasich
Attorney, Agent, or Firm—Lowe, King, Price & Becker

[57] ABSTRACT

There are provided at least two liquid level detectors in a liquid tank, such as an automobile fuel tank. The detectors are connected so as to obtain the sum of the output signals of the detectors. The positions of the detectors in the tank are determined on the basis of a predetermined reference point. If the reference point lies on a liquid surface formed by a certain amount of a liquid contained in the tank when the tank is horizontal, then the liquid level at the reference point is constant when the tank is inclined so that a horizontal axis of the tank slopes down in one direction at a predetermined angle with the horizontal and when the tank is inclined so that the horizontal axis slopes down in the opposite direction at the same angle with the horizontal. One of the detectors is disposed in a first vertical plane, and the other in a second vertical plane. The first and second vertical planes are perpendicular to the above-mentioned axis of the tank, and symmetrical with respect to the above-mentioned reference point.

12 Claims, 8 Drawing Figures

SYSTEM FOR MEASURING QUANTITY OF LIQUID CONTAINED IN TANK

BACKGROUND OF THE INVENTION

The present invention relates to a system for measuring the quantity of a liquid contained in a tank, such as a fuel tank mounted on a vehicle.

Japanese Utility Model provisional publication Sho No. 51-80158 discloses one example of such a liquid quantity measuring system. In this system, two liquid level detectors are disposed on a diagonal line of a liquid tank, apart from each other. The output signals of these liquid level detectors are added to give indication of the residual liquid quantity. This measuring system is suitable for a tank whose shape is a rectangular parallelepiped or other symmetrical shape. However, this measuring system is unsatisfactory when the shape of a liquid tank is unsymmetrical and complicated.

SUMMARY OF THE INVENTION

It is an object of the present invention to provide a liquid quantity measuring system suitable for an automobile fuel tank, or the like, having an unsymmetrical complicated shape.

According to the present invention, a liquid quantity measuring system comprises a liquid tank for containing a liquid, first and second liquid level detecting means, and indicating means. The liquid tank is normally held in a normal horizontal position. The liquid tank has a shape which has a first horizontal axis which is horizontal when the tank is in the normal horizontal position and extends from a first end to a second end, and a vertical axis which is vertical when the tank is in the normal horizontal position. The tank is capable of taking a first inclined position in which the tank is rotated, in one direction, about an axis perpendicular to the first horizontal axis so that the first horizontal axis slopes down at a first predetermined angle with the horizontal from the first end to the second end, and a second inclined position in which the tank is rotated, in the opposite direction, about an axis perpendicular to the first horizontal axis so that the first horizontal axis slopes down at the first predetermined angle with the horizontal from the second end to the first end. The first liquid level detecting means is disposed in a first vertical plane which is parallel with the vertical axis and perpendicular to the first horizontal axis for detecting a liquid level at a point lying on the first vertical plane within the tank. The second detecting means is disposed in a second vertical plane which is parallel with the vertical axis and perpendicular to the first horizontal axis for detecting a liquid level at a point lying on the second vertical plane within the tank. The first and second vertical planes are symmetrical with respect to a first predetermined reference point which lies on a liquid surface formed by a first predetermined quantity of a liquid contained in the tank in the normal position and at which a liquid level determined by the first predetermined quantity of a liquid contained in the tank in the first inclined position is approximately equal to a liquid level determined by the first predetermined quantity of a liquid contained in the tank in the second inclined position. Each of the first and second detecting means produces an output signal indicative of the detected liquid level at its respective location. The indicating means is connected with the first and second detecting means, and produces an output signal indicative of the sum of the output signals of the first and second detecting means.

DETAILED DESCRIPTION OF THE INVENTION

Figure 1:
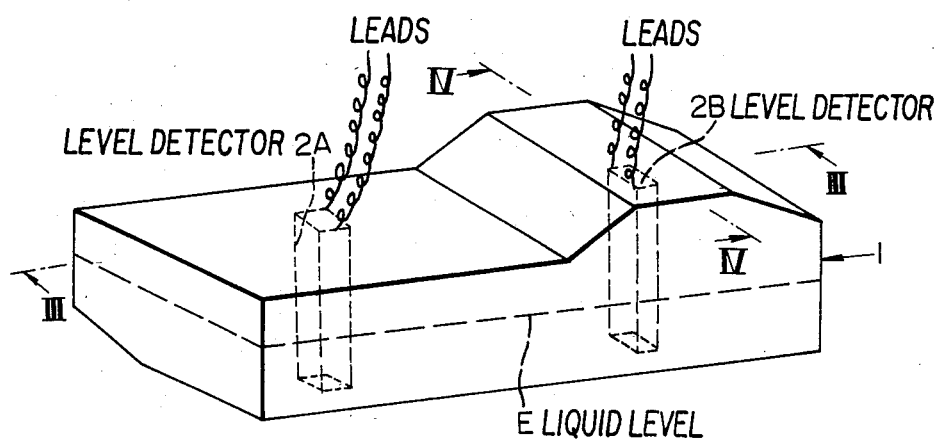
FIG. 1 is a perspective view of a liquid tank for showing one embodiment of the present invention.
Figure 2:
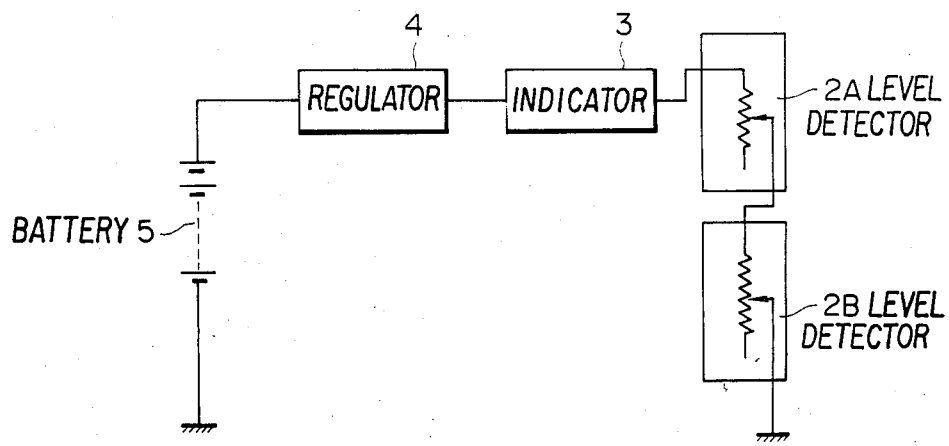
FIG. 2 is a circuit diagram showing the connection of liquid level detectors shown in FIG. 1, for the case where the detectors are of the variable electrical resistance type.

One embodiment of the present invention is shown in FIGS. 1 to 6. In FIG. 1, a liquid tank 1 contains a liquid E. In the tank 1, there are provided at least two liquid level detectors 2A and 2B, each of which produces an output signal whose amplitude is proportional to the height of the surface of the liquid. The liquid level detectors 2A and 2B may be of a float type, a capacitance type, an optical type or other known type. The detectors 2A and 2B are connected so as to obtain the sum of the output signals of the detectors 2A and 2B. In the case of FIG. 2, the detectors 2A and 2B are connected in series because these detectors are here selected to be of the type in which a resistance is varied in accordance with the height of the liquid surface. An indicator 3 is connected with the combination of the detectors 2A and 2B so that the indicator 3 can indicate the sum of the output signals of the detectors 2A and 2B. The detectors 2A and 2B are connected with a battery 5 through the indicator 3 and a regulator 4 for regulating a current.

Figure 3:
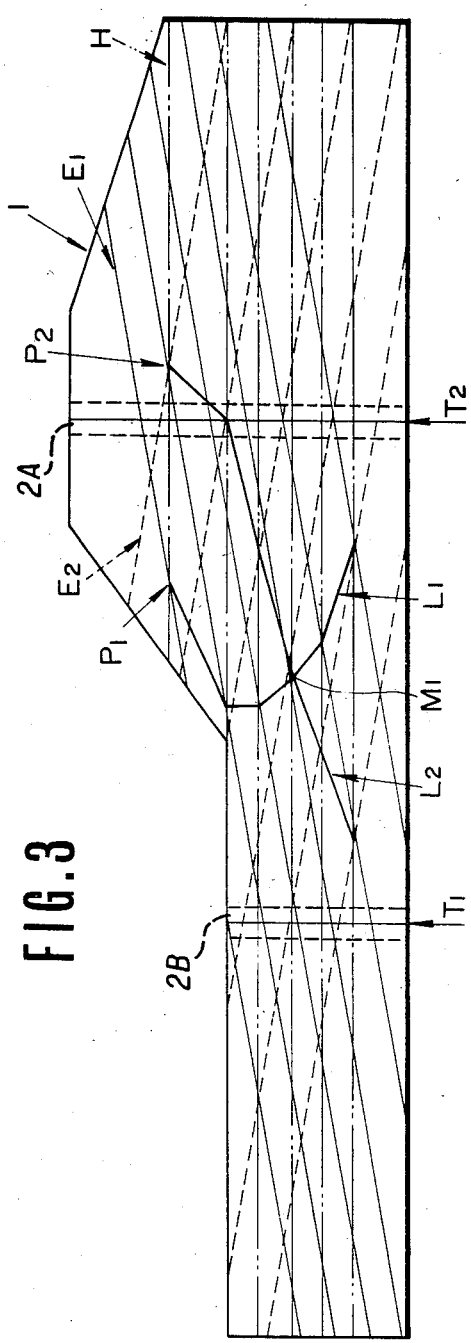
FIG. 3 is a cross sectional view of the tank taken along a line III—III of FIG. 1, for showing liquid lines obtained by rotating the tank about an axis perpendicular to the cross section and changing the amount of a liquid.

In the cross section of FIG. 3, a horizontal line H is a liquid line which is the intersection between the cross section of FIG. 3 and the liquid surface formed by a given amount of the liquid contained in the tank 1 when the tank 1 is in a normal horizontal position. The tank 1 has a first axis which is parallel with the cross section of FIG. 3, and horizontal when the tank 1 is in the normal horizontal position. The first axis of the tank extends from a left side of the tank which is leftward in FIG. 3 to a right side of the tank which is rightward in FIG. 3. A line $E_1$ is a liquid line formed by the given amount of the liquid when the tank 1 is inclined so that the first horizontal axis slopes down at a predetermined angle, for example, about 10 degrees, with the horizontal from the left side to the right side. A line $E_2$ is a liquid line in which the cross section intersects the liquid surface formed by the given amount of the liquid contained in the tank 1 when the tank 1 is inclined so that the first horizontal axis slopes down at the same predetermined angle with the horizontal from the right side to the left side. The liquid line $E_1$ intersects the horizontal liquid line H of the same amount of the liquid at an equal-level point $P_1$. The liquid line $E_2$ intersects the horizontal liquid line H formed by the same amount of the liquid at an equal-level point $P_2$. In FIG. 3, there are many different sets of the liquid lines H, $E_1$ and $E_2$, and the equal-level points $P_1$ and $P_2$ which are obtained by changing the amount of the liquid. A line $L_1$ is a line obtained by joining serially the equal-level points $P_1$ obtained by using various amounts of the liquid. A line $L_2$ is a line joining the equal-level points $P_2$ similarly. The line $L_1$ intersects the line $L_2$ at a first reference point $M_1$. A plane $T_1$ which is perpendicular to the cross section of FIG. 3, and a plane $T_2$ which is perpendicular to the cross section of FIG. 3 are symmetrical with respect to the first reference point $M_1$. One of the level detectors 2A and 2B is disposed in the plane $T_1$, and the other is disposed in the plane $T_2$.

Figure 4:
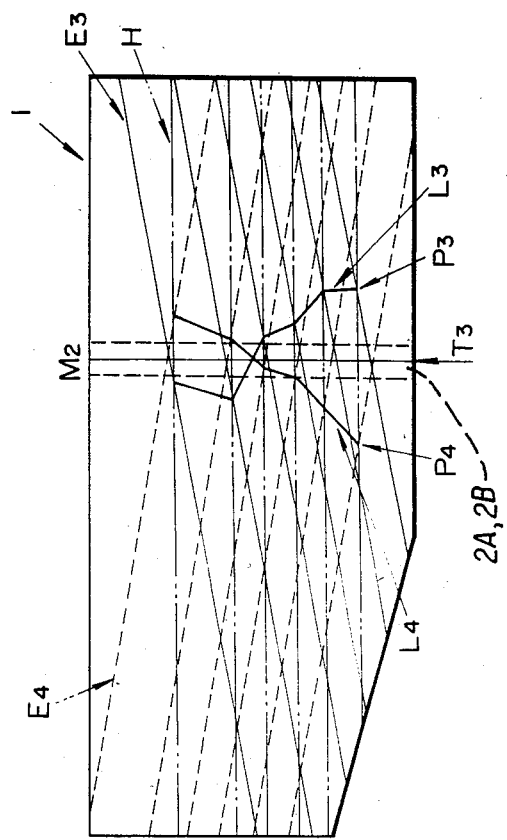
FIG. 4 is a cross sectional view of the tank taken along a line IV—IV of FIG. 1, for showing liquid lines obtained by rotating the tank about an axis perpendicular to the cross section of FIG. 4 and changing the amount of a liquid.
Figure 7:
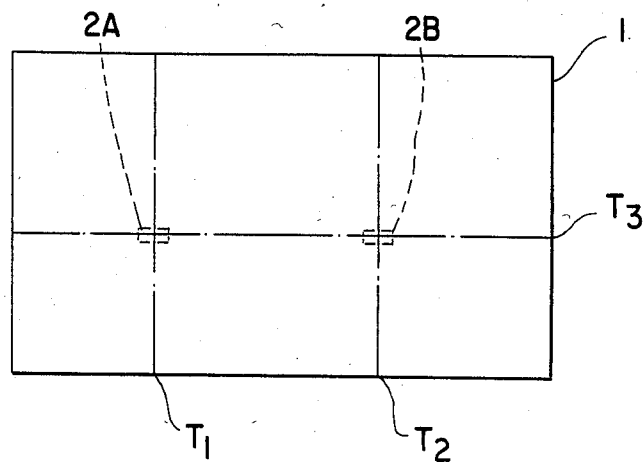
FIG. 7 is a plan view of the liquid tank of FIG. 1.

In the cross section of FIG. 4, taken along the line IV—IV of FIG. 1, a horizontal line H is a liquid line which is the intersection between the cross section of FIG. 4 and the liquid surface formed by a given amount of the liquid contained in the tank 1 in the normal horizontal position. The tank 1 has a second axis which is parallel with the cross section of FIG. 4, and horizontal when the tank 1 is in the normal horizontal position. The second axis of the tank 1 extends from a front side of the tank 1 which is rightward in FIG. 4 to a rear side of tank 1 which is leftward in FIG. 4. A line $E_3$ is a liquid line formed by the given amount of the liquid contained in the tank 1 when the tank 1 is inclined so that the second axis of the tank slopes down at a predetermined angle, about 10 degrees, for example, with the horizontal, from the rear side to the front side. A liquid line $E_4$ is a liquid line formed by the given amount of the liquid contained in the tank 1 when the tank 1 is inclined so that the second axis of the tank 1 slopes down at the predetermined angle with the horizontal from the front side to the rear side. The liquid line $E_3$ intersects the horizontal liquid line H of the same liquid amount at an equal-level point $P_3$. The liquid line $E_4$ intersects the horizontal liquid line H of the same liquid amount to an equal-level point $P_4$. In FIG. 4, there are many different sets of the liquid lines H, $E_3$, and $E_4$ and the equal-level points $P_3$ and $P_4$ which are obtained by changing the liquid amount. A line $L_3$ is a line joining serially the equal-level points $P_3$ corresponding to various amounts of the liquid. A line $L_4$ is a line joining the equal-level points $P_4$ similarly. The line $L_3$ intersects the line $L_4$ at a second reference point $M_2$. A plane $T_3$ perpendicular to the cross section of FIG. 4 passes through the second reference point $M_2$. The tank of this embodiment is not very complicated in the cross sectional shape of FIG. 4. Accordingly, for simplicity, the level detectors 2A and 2B are disposed in the plane $T_3$, in common as shown in FIG. 7. That is, the detector 2A is disposed in a line in which the plane $T_1$ intersects the plane $T_3$, so as to detect the liquid level along this line. The detector 2B is disposed in a line in which the plane $T_2$ intersects the plane $T_3$, so as to detect the liquid level along this line of intersection. it is not necessary to dispose the level detectors 2A and 2B in the common plane $T_3$ when the tank cannot be rotated about an axis perpendicular to the cross section of FIG. 3.

Figure 8:
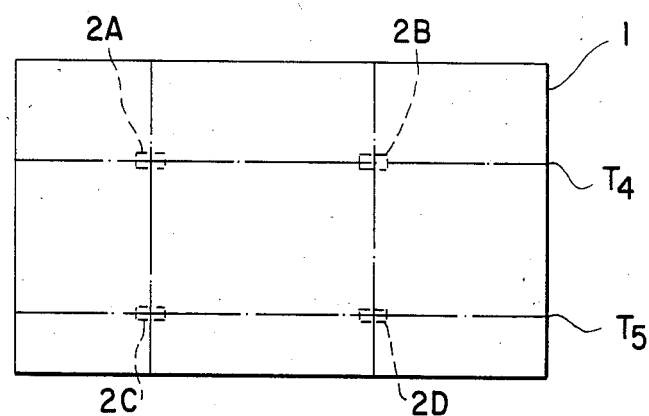
FIG. 8 is a plan view similar to FIG. 7, showing an embodiment of the present invention utilizing four liquid level detectors.

The accuracy of liquid quantity measurement can be increased by using four liquid level detectors 2A, 2B, 2C and 2D, as shown in FIG. 8. In this case, each of the four detectors is disposed at one of four intersections formed by the vertical planes $T_1$ and $T_2$ and additional two vertical planes $T_4$ and $T_5$ which are perpendicular to the cross section of FIG. 4 and symmetrical with respect to the second reference point $M_2$ so that each intersection has one detector.

Figure 5:
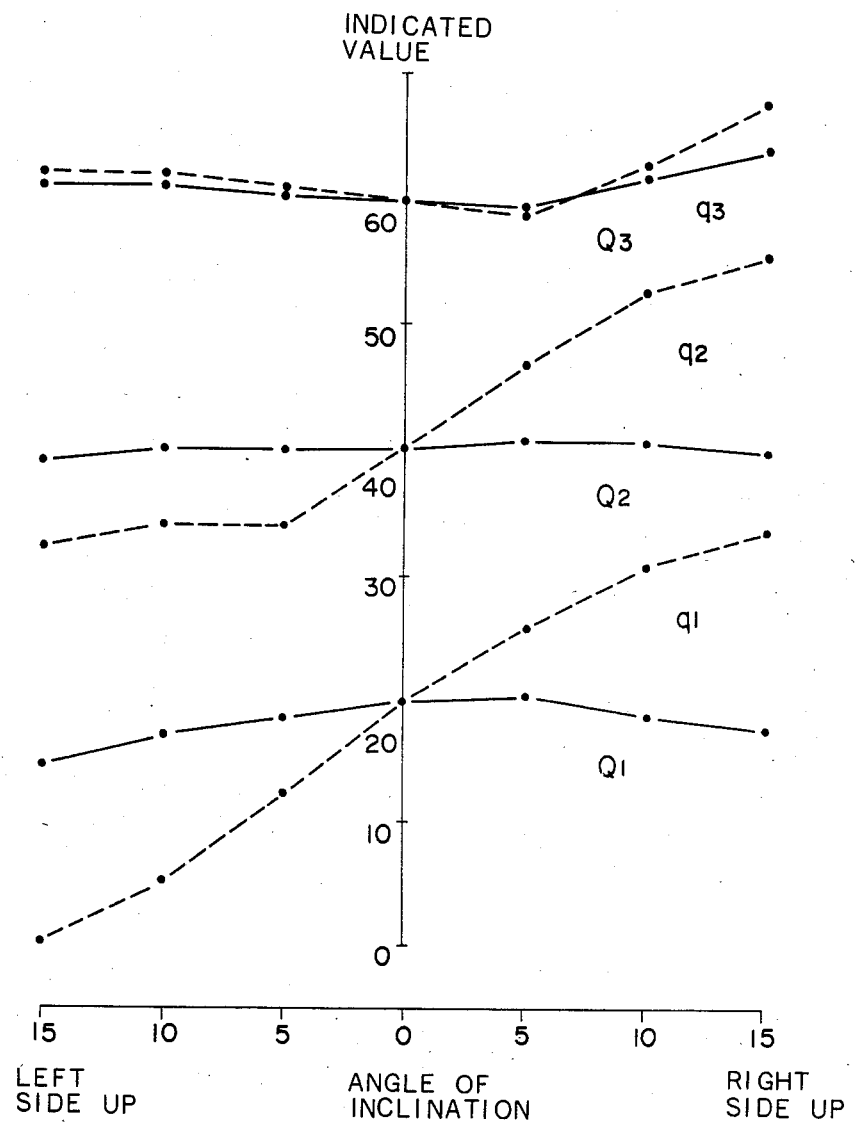
FIG. 5 is a graphical representation showing the indicated values obtained by using the system of FIGS. 1 and 2 in the case of FIG. 3.
Figure 6:
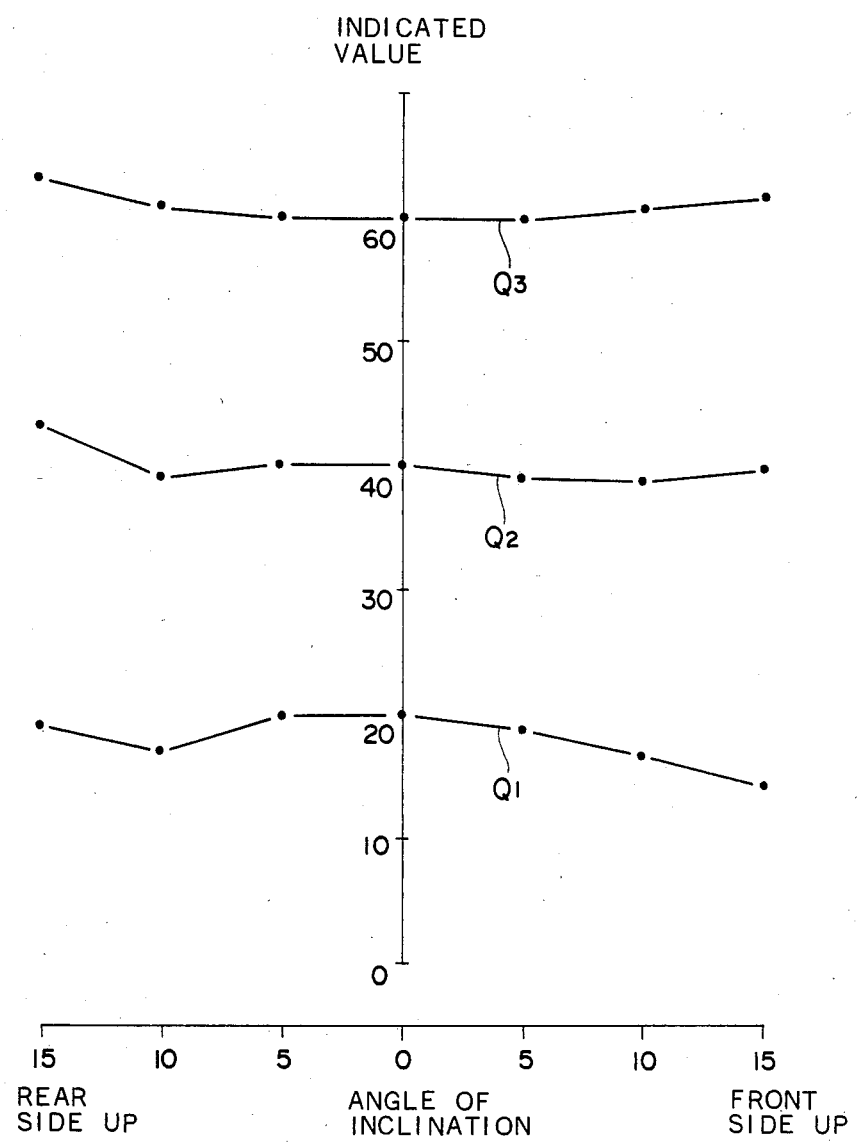
FIG. 6 is a graphical representation showing the indicated values obtained by using the system of FIGS. 1 and 2 in the case of FIG. 4.

The results of actual measurement using the system of this embodiment having two liquid level detectors are shown in FIGS. 5 and 6, in which the values indicated by the indicator 3 are plotted by using a scale determined arbitrarily. In the case of FIG. 5, the tank 1 is rotated about an axis perpendicular to the cross section of FIG. 3. In the case of FIG. 6, the tank 1 is rotated about an axis perpendicular to the cross section of FIG. 4. In each of FIGS. 5 and 6, lines $Q_1$, $Q_2$ and $Q_3$ are obtained by maintaining the liquid amount in the tank constant. A liquid amount used to obtain the line $Q_2$ is greater than a liquid amount of the line $Q_1$, and a liquid amount of the line $Q_3$ is greater than the liquid amount of the line $Q_2$. As evident from FIGS. 5 and 6, all the lines $Q_1$, $Q_2$ and $Q_3$ are very flat irrespective of the angle of inclination and the liquid amount. That is, the indicated value is maintained almost constant irrespective of the angle of inclination of any of the liquid amounts. Lines $q_1$, $q_2$ and $q_3$ in FIG. 5 show the indicated values obtained by using only one liquid level detector in the tank 1. Each of the lines $q_1$, $q_2$ and $q_3$ deviates more and more from the value obtained when the tank is in the normal horizontal position, as the angle of inclination increases. This tendency is greater when the liquid amount is smaller.

According to the present invention, the liquid quantity or the main liquid level in the tank can be approximated accurately irrespective of the inclination of the tank and the change of the liquid amount in the tank, without increasing the manufacturing cost of the liquid tank and the liquid level detectors.

What is claimed is:
1. A liquid quantity measuring system, comprising:
a liquid tank for mounting on a vehicle, said tank having a first cross section which is vertical when said tank is in a normal horizontal position and which is unsymmetrical so that a normal liquid surface, a first inclined liquid surface and a second inclined liquid surface, which would be formed by a liquid of a given quantity in said tank when said tank is in said normal horizontal position, and in first and second oppositely inclined positions, respectively, in which said tank is rotated about a first rotation axis perpendicular to said first cross section through a first predetermined angle from said normal position in opposite directions, have such a spacial relation that a first equal-level point at which a horizontal intersection line between said normal and first inclined liquid surfaces intersects said first cross section, and a second equal-level point at which a horizontal intersection line between said normal and second inclined liquid surfaces intersects said first cross section, are normally located apart from each other at a distance which varies when the liquid quantity in said tank is varied;

first and second liquid level detecting means disposed, respectively, in first and second vertical planes within said tank for detecting a liquid level in said first and second vertical planes, said first and second vertical planes being perpendicular to said first cross section, and vertical when said tank is in said normal horizontal position, said first and second vertical planes being symmetrical with respect to a first reference point which is substantially an intersection between a first path traveled by said first equal-level point when the liquid quantity in said tank is varied, and a second path traveled by said second equal-level point when the liquid liquid in said tank is varied, each of said first and second detecting means producing an output signal indicative of the detected liquid level; and adding means, connected with said first and second detecting means, for producing a liquid quantity output signal obtained from the sum of the output signals of said first and second detecting means.

2. A liquid quantity measuring system according to claim 1, wherein said first and second detecting means are disposed in a common vertical plane perpendicular to said first and second vertical planes for detecting a liquid level along vertical intersection line between said first and common vertical planes and a vertical intersection line between said second and common vertical planes, respectively.

3. A liquid quantity measuring system according to claim 2, wherein said tank has a second cross section which is vertical when said tank is in said normal horizontal position and which is unsymmetrical so that said normal liquid surface, and third and fourth inclined liquid surfaces which would be formed by the liquid of a given quantity in said tank when said tank is in said normal horizontal position, and in third and fourth oppositely inclined positions, respectively, in which said tank is rotated about a second rotation axis perpendicular to said second cross section through a second predetermined angle from said normal position in opposite directions, have such a spacial relation that a third equal-level point at which a horizontal intersection line between said normal and third inclined liquid surfaces intersects said second cross section, and a fourth equal-level point at which a horizontal intersection line between said normal and fourth inclined liquid surfaces intersects said second cross section, are normally located apart from each other at a distance which varies when the liquid quantity in said tank is varied, said common vertical plane passing through a second reference point which is substantially an intersection between a third path traveled by said third equal-level point when the liquid quantity in said tank is varied, and a fourth path traveled by said fourth equal-level point when the liquid quantity in said tank is varied.

4. A liquid quantity measuring system according to claim 3, wherein said first and second detecting means are connected in series so as to produce a signal indicative of the sum of the output signals of said first and second detecting means.

5. A liquid quantity measuring system according to claim 4, wherein said second cross section is perpendicular to said first cross section.

6. A liquid quantity measuring system according to claim 5, wherein the first predetermined angle is equal to the second predetermined angle.

7. A liquid quantity measuring system according to claim 6, wherein said first and second predetermined angles are both about 10 degrees.

8. A liquid quantity measuring system according to claim 7, wherein the shape of said tank is unsymmetrical with respect to a vertical plane which is parallel with said first and second vertical planes, and passes through said first reference point.

9. A liquid quantity measuring system according to claim 1, wherein said tank has a second cross section which is vertical when said tank is in said normal horizontal position and which is unsymmetrical so that the normal liquid surface, and third and fourth inclined liquid surfaces which would be formed by the liquid of a given quantity in said tank when if said tank is in said normal position, and third and fourth oppositely inclined positions, respectively, in which said tank is rotated about a second rotation axis perpendicular to said second cross section through a second predetermined angle from said normal position in opposite directions, have such a spacial relation that a third equal-level point at which a horizontal intersection line between the normal and third inclined liquid surfaces intersects said second cross section, and a fourth equal-level point at which a horizontal intersection line between the normal and fourth inclined liquid surfaces intersects said second cross section, are normally located apart from each other at a distance which varies when the liquid quantity in said tank is varied, and wherein said liquid quantity measuring system further comprises third and fourth liquid level detecting means disposed, respectively, in third and fourth vertical planes within said tank for detecting a liquid level in said third and fourth vertical planes, said third and fourth vertical planes being perpendicular to said second cross section, and vertical when said tank is in said normal position, said third and fourth vertical planes being symmetrical with respect to a second reference point which is substantially an intersection between a third path traveled by said third equal-level point when the liquid quantity is said tank is varied, and a fourth path traveled by said fourth equal-level point when the liquid quantity in said tank is varied, each of said third and fourth detecting means producing an output signal indicative of the detected liquid level, said third and fourth detecting means being connected with said adding means, the output signal of said adding means being indicative of the sum of the output signals of said first, second, third and fourth detecting means.

10. A liquid quantity measuring system according to claim 9, wherein said first, second, third and fourth detecting means are disposed in four intersections formed by said first, second, third and fourth vertical planes so as to assign uniquely one of the four detecting means to each intersection.

11. A liquid quantity measuring system according to claim 9, wherein said first, second, third and fourth detecting means are connected in series.

12. A liquid quantity measuring system according to claim 1, wherein said first and second detecting means are connected in series.

* * * * *